United States Patent [19]

Mróz et al.

[11] Patent Number: 4,551,242
[45] Date of Patent: Nov. 5, 1985

[54] APPARATUS FOR DYNAMIC CLASSIFICATION OF SUSPENSIONS OF SOLID BODIES IN LIQUIDS

[75] Inventors: Andrzej Mróz; Stanislaw Wro ski, both of Warsaw, Poland

[73] Assignee: Politechnika Warszawska, Warsaw, Poland

[21] Appl. No.: 659,718

[22] Filed: Oct. 11, 1984

[30] Foreign Application Priority Data

Oct. 12, 1983 [PL] Poland .................................. 244126

[51] Int. Cl.$^4$ ............................................... B03D 1/00
[52] U.S. Cl. ...................................... 209/211; 209/264; 209/270; 210/512.1
[58] Field of Search ............... 209/211, 250, 264, 270, 209/303, 304; 210/512.1, 512.3, 359, 382, 360.2, 380.3

[56] References Cited

U.S. PATENT DOCUMENTS 3,262,573 7/1966 Schutte .............................. 210/360.2
4,268,488 4/1981 Condolios .................... 210/512.1 X
4,347,135 8/1982 Lofosse et al. .............. 210/512.1 X

FOREIGN PATENT DOCUMENTS 0117022 6/1980 Poland .
0983989 2/1965 United Kingdom ............. 210/360.2

*Primary Examiner*—Charles Hart
*Attorney, Agent, or Firm*—Ladas & Parry

[57] ABSTRACT

Apparatus for a dynamic classification of suspensions of solid bodies in liquids consisting of a cylindrical body with a conical bottom terminated with an outlet stub pipe, provided with a tangentially situated inlet stub pipe and a co-axially situated rotatable perforated cylindrical element covered with gauze mesh and mounted on a hollow drive shaft, wherein in the cylindrical room between the inner wall of the body and the gauze there are co-axial baffles which are not in direct contact with one another and are so spaced from one another that the inner edge of the baffle lying above is situated below the level of the inner edge of the baffle lying below and the rotating cylindrical element is connected to a thickening worm screw.

1 Claim, 4 Drawing Figures

APPARATUS FOR DYNAMIC CLASSIFICATION OF SUSPENSIONS OF SOLID BODIES IN LIQUIDS

BACKGROUND OF THE INVENTION

This invention relates to an apparatus for a dynamic classification of suspensions of solid bodies in liquids.

Those skilled in art know from Polish patent specification No. 117 022 apparatus for classification of suspensions of solid bodies in liquids, wherein the suspension to be classified is directed to an annular space, where it is mixed and separated by means of a rotating cylindrical perforated element covered with a gauze; through said gauze a suspension of particles of a solid body of diameter smaller than the gauze mesh flows to the interior of said cylindrical element and next is ejected outside the apparatus as a result of the vacuum produced. The suspension containing particles of diameter greater than the gauze mesh moves down in the cylindrical space between the body and the rotating cylindrical element toward the bottom of the apparatus, wherefrom it is drained by outlet stub pipe.

In the apparatus so far known all the particles of the solid phase with diameter greater than the gauze mesh are mixed by the rotating cylinder over the whole height of the apparatus. Simultaneously with this mixing operation smaller particles of solid phase flow inside the rotating cylinder which leads to a non-uniform operation of the apparatus and to a imprecise separation of the particles of the solid body, because each element of the rotating cylinder operates in different hydrodynamic conditions. What is more, the suspension of the particles having diameters greater than the gauze mesh is being moved toward the outlet stub pipe only by gravity and, in consequence, it is not thickened and, for this reason, additional thickening facilities must be used.

SUMMARY OF THE INVENTION

The aim of the invention has been the design of an apparatus applicable for a dynamic classification of suspensions of solid bodies in liquids which would not have the above mentioned inconveniences and which would enable a sharp enough separation of the suspension into the individual fractions of the required granulation and obtaining suspension of particles of diameter greater than the gauze mesh with considerable concentration.

It has been shown that this aim can be achieved by mounting suitable annular baffles coaxially inside the cylindrical space of the classifying apparatus between the inner wall of the body and the gauze, these baffles should not be in contact with the body and the gauze and should be situated at such distances that the outer edge of the baffles lying above would be situated below the level of the inner edge of the baffles lying below and that the rotating cylindrical element should be connected to thickening worm screw.

BRIEF DESCRIPTION OF THE DRAWINGS

The apparatus according to the invention has been shown in the drawing showing the longitudinal section of the apparatus, wherein 1 corresponds to inlet pipe stub, 2-rotating cylindrical element, 3-gauze mask, 4-hallow driveshaft, 5-thickening worm screw, 6-annular diaphragms, 7-body of the apparatus and 8-inlet stub pipe.

DETAILED DESCRIPTION

Figure 1:
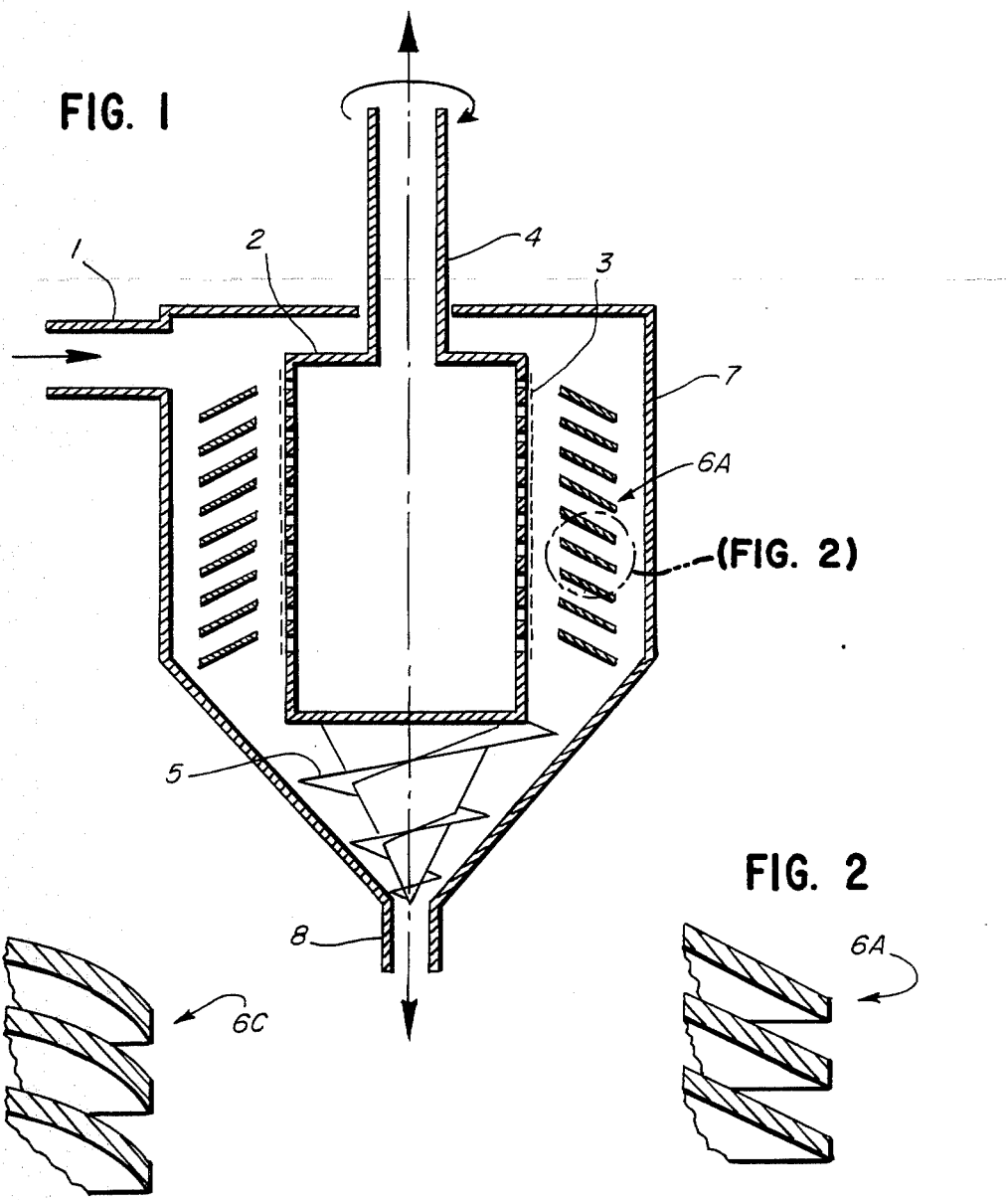
Figure 2:
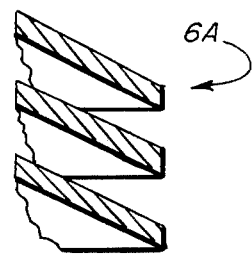
Figure 4:
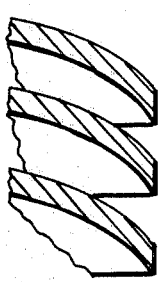
Figure 3:
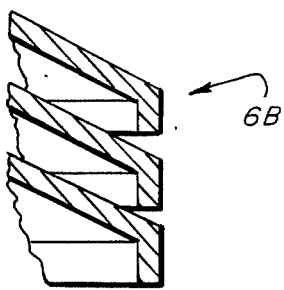

The principle of operation of the apparatus according to the invention consists in that a raw suspension is supplied through a tangential stub pipe 1 to the annular space between a cylindrical body 7 and a rotating cylinder 2 covered with gauze mask 3 and is directed to the zone of a violent agitation produced by the rotary motion of the cylinder 2. As a result of the action of centrifugal force and tangential stresses, particles of diameters greater than the gauze mesh are thrown away toward the body of the apparatus 7. In consequence of of an arrangement of nested annular baffles 6 these particles fall down under gravity forces to the bottom part of the body 7 and do not return to the zone of operation of the rotating cylindrical element 2, whereas the suspension of particles of solid phase of diameters smaller than the gauze mesh 3 flows through the gauze mesh 3 inside the rotating cylindrical element 2 as a result of the existing pressure differences, and next is directed outwards through a hollow drive shaft 4.

The particles of dimensions greater than the gauze mesh falling down under gravity forces slong the body of the apparatus enter the zone of operation of the thickening worm screw 5, where the suspension is thickened and, simultanously, it is moved toward the outlet pipe stub 8 and ejected through this pipe. As a result, a sharp separation of the suspension particles is obtained and the suspension of particles greater than the gauze mesh has high enough concentration. An additional advantage of the apparatus according to the invention consists in a diminished erosive action of the particles on the gauze this being due to elimination of direct contact of the gauze with the particles of solid phase of greater diameters.

We claim:

1. In an apparatus for dynamic classification of suspensions of solid bodies in liquids, consisting of a vertically arranged cylindrical body with a conical bottom terminated with an outlet stub pipe, said apparatus being provided with an inlet stub pipe situated tangentially and a rotatable vertically mounted cylindrical perforated element situated co-axially within said cylindrical body, said element being covered with a gauze mesh and mounted on a vertically arranged hollow drive shaft, said apparatus being characterized in that a cylindrical space is provided between the inner wall of the body and the gauze defining an agitation zone in which there are mounted a plurality of stationary annular baffles which do not contact either the body or the gauze, each said baffle having an outwardly and downwardly sloping profile between an inner circular edge and an outer circular edge, and are generally nested one beneath the other in a vertical arrangement and so spaced from one another that the outer edge of the upper annular baffle lies below the inner edge of the next lower annular baffle, and the rotatable cylindrical element has connected to its bottom a thickening means in the form of a worm screw rotatable within the conical bottom part of said body.

* * * * *